Oct. 4, 1955  S. H. WEAVER  2,719,762

WATER LUBRICATED BEARING

Filed April 14, 1953

INVENTOR
SAMUEL H. WEAVER
BY
HIS ATTORNEY

United States Patent Office 2,719,762
Patented Oct. 4, 1955

2,719,762
WATER LUBRICATED BEARING

Samuel H. Weaver, Phillipsburg, N. J., assignor to Ingersoll-Rand Company, New York, N. Y., a corporation of New Jersey Application April 14, 1953, Serial No. 348,698

6 Claims. (Cl. 308—121)

The invention relates to bearings and more particularly to water lubricated bearings for centrifugal pumps.

Many vertical centrifugal pumps handle water containing silt and very frequently it is necessary to use this water to lubricate the bearings for the pump shaft. In such situations it often happens that the silt in the water collects in the bearing and plugs it so as to prevent circulation of the water through the bearing.

Accordingly, it is an object of the invention to provide a bearing for vertical centrifugal pumps which is constructed so as to prevent silt in the water from collecting in the bearing and thereby preventing circulation of the water lubricant.

Other objects of the invention will be in part obvious and in part pointed out hereinafter.

Briefly, the objectives of the applicant's invention are achieved by constructing the bearing with a chamber to receive silt and by including water directing means for directing silt bearing water to the chamber and clean water to the bearing. In the preferred embodiment of the invention disclosed in the specification an annular chamber is provided at the top of the vertical bearing and water is introduced into the chamber tangentially to impart a swirling motion to the water which centrifuges the silt in the water to the outer periphery of the chamber and out through an opening in the bearing.

Figure 1:
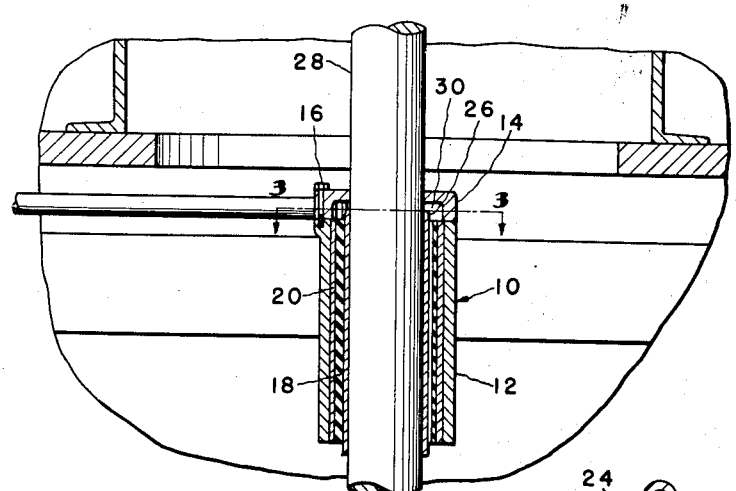
Figure 2:
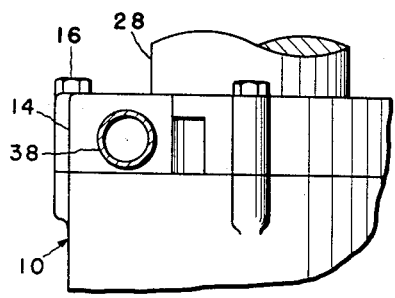
Figure 3:
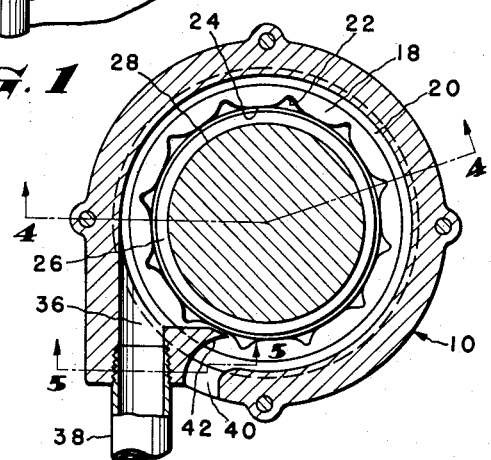
Figure 4:
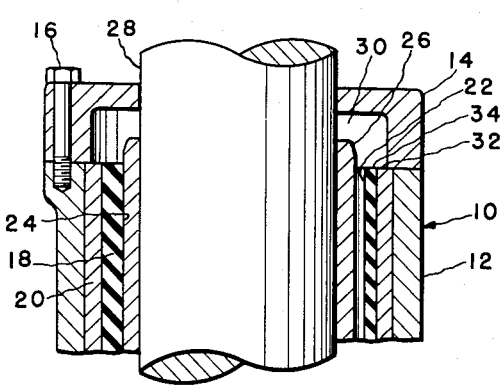
Figure 5:
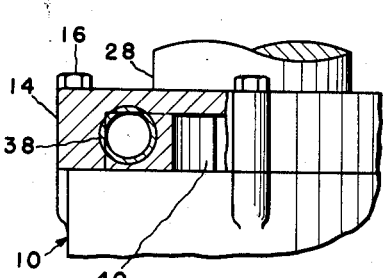

In the drawings which accompany the specification and in which similar reference numerals refer to similar parts, Figure 1 is a longitudinal section along the center line of the bearing showing the application of the invention to the shaft of a vertical centrifugal pump, Fig. 2 is an external view of that portion of the bearing having the inlet and outlet passages for the lubricating water, Fig. 3 is a transverse section through Fig. 1 taken along the line 3—3 looking in the direction of the arrows, Fig. 4 is a longitudinal section along the center line of the upper portion of the bearing, and Fig. 5 is a view taken through Fig. 3 along the line 5—5 looking in the direction of the arrows.

Turning now to the drawings for a detailed description of the preferred embodiment of the applicant's invention, the bearing 10 comprises a cylindrical casing 12 and a bearing cap 14 joined by machine screws 16 to the cylindrical casing, at the upper end thereof. Inserted within the cylindrical casing 12 is a bearing member consisting of a rubber bearing 18 bonded to a bearing sleeve 20. While the applicant chooses to employ a rubber bearing in the preferred form of his invention this feature does not constitute a part of the invention and any other suitable bearing material may be used. The rubber bearing 18 is formed with vertical grooves or passages 22 extending throughout the length of the bearing, the purpose of the passages being to convey the water through the bearing. Intermediate of the passages 22 are bearing surfaces 24 which bear on a shaft sleeve 26 placed around the pump shaft 28 to protect the shaft against scoring by the grit in the water.

The bearing cap 14 encircles the shaft 28 and abuts the upper end portion of the cylindrical casing 12. Situated within the central portion of the cap is a circular recess which together with the shaft 28 forms an annular chamber 30. The inner periphery of the chamber communicates with the open ends of the vertical passages 22 in the rubber bearing 18 while the outer periphery of the chamber 30 overlaps the ledge formed by the respective end portions 32—34 of the bearing sleeve 20 and the rubber bearing 18.

An opening 36 is provided in the bearing cap 14 to permit the introduction of water into the annular chamber and is positioned tangentially with respect to the annular chamber 30. A conduit 38 conveys the lubricating water from any suitable source (not shown) to the inlet opening 36. An outlet opening 40, located adjacent the inlet opening 36 is also provided in the bearing cap 14. A partition 42 between the inlet opening 36 and the outlet opening 40 prevents direct communication between the two and causes the water introduced through the conduit 38 to pass circumferentially around the annular chamber and exit through outlet opening 40.

The operation of the invention is as follows: water is introduced under pressure to the chamber 30 through the conduit 38 and the inlet opening 36. As a result of the tangential location of the inlet opening and also because of the rotation of the vertical pump shaft 28 a swirling motion is imparted to the water which centrifuges the silt in the water to the outer periphery of the chamber and away from the open end portions of the passages 22 in the rubber bearing 18. The silt thus collected flows circumferentially around the chamber 30 on the respective end portions 32—34 of the bearing sleeve and rubber bearing until it reaches the outlet opening 40 through which it passes out of the bearing. In this manner the clean water is permitted to enter the vertical passages 22 while the silt bearing water is directed away from the passages 22 so that no plugging can occur in the bearing and proper circulation of the lubricating water is assured at all times.

The applicant has only described and disclosed a preferred embodiment of his invention. Since the applicant's disclosure will suggest many alternative constructions the applicant does not wish to be limited to the form of the invention shown and described in the application but only by the scope of the appended claims.

I claim:

1. The combination of a water lubricated bearing and a rotary shaft, said bearing comprising a member having bearing surfaces, passages between the bearing surfaces to receive water for lubricating the bearing surfaces, another member on the first said member having a chamber partly encircling the shaft to receive silt, water directing means for directing silt bearing water to the periphery of the chamber and clean water to the passages in the bearing surfaces, and conduit means for conveying the silt from the chamber.

2. The combination of a water lubricated bearing and a rotary shaft, said bearing comprising a member having bearing surfaces for the shaft, passages between the bearing surfaces to receive water, another member overlying an end of the first said member and having a partly annular silt receiving chamber located outwardly of the passages in the bearing surfaces, centrifuging means for directing silt bearing water outwardly to the periphery of the chamber and clean water to the passages in the bearing surfaces, and means for conveying the silt bearing water from the chamber.

3. The combination with a rotary shaft of a water lubricated bearing comprising a member having bearing surfaces, passages between the bearing surfaces to receive water, another member seated upon an end of the first said member and having a circular chamber to receive silt, said chamber communicating, at the inner area thereof, with the passages in the bearing surfaces, a conduit located tangentially with respect to the circular chamber for introducing water into the chamber, and a passageway in said other member for conveying silt from the chamber.

4. The combination with a rotary shaft of a water lubricated bearing comprising a member having bearing surfaces, passages between the bearing surfaces to receive water, another member seated upon an end of the first said member and having a circular chamber to receive silt, said chamber communicating, at the inner area thereof, with the passages in the bearing surfaces, a conduit located tangentially with respect to the circular chamber for introducing water into the chamber, and a passageway in the chamber adjacent the conduit communicating the chamber with the atmosphere.

5. The combination of a water lubricated bearing and a vertical rotary shaft, said bearing comprising a member having bearing surfaces for the shaft, vertical passages between the bearing surfaces to receive water, another member located at the upper end of the first-mentioned member and having a circular chamber to receive silt, said chamber communicating, at the inner area thereof, with the passages in the bearing surfaces, a conduit located tangentially with respect to the chamber to introduce water into the chamber so as to flow circumferentially around the chamber, a passageway in the chamber adjacent the conduit on the upstream side thereof relative to flow in the chamber and communicating the chamber with the exterior of said other member, and a partition in the chamber between the conduit and the passageway to direct the silt centrifuged around the chamber by the circumferential flow of water outwardly through the passageway.

6. The combination with a rotary shaft of a water lubricated bearing comprising a tubular shaped member encircling the shaft and having longitudinal bearing surfaces in contact with the shaft, longitudinal grooves in the inner surface of said member extending throughout the length thereof and being located between said bearing surfaces, a cap member overlying an end of the first said member and having a chamber therein completely encircling the shaft and being of greater radial width than the depth of said grooves, said chamber being in communication with the ends of said grooves, an inlet in said cap member, the downstream end portion of which inlet opens into said chamber and the axis of such portion is substantially tangential with respect to the chamber for introducing silt laden water into the chamber so as to flow circumferentially therearound, an outlet passageway for said chamber adjacent said inlet on the upstream side thereof relative to the flow in the chamber for the discharge of silt and water centrifuged around the chamber by the circumferential flow of water therearound, and a partition extending into the chamber to a point adjacent said shaft and located between said inlet and outlet.

References Cited in the file of this patent

UNITED STATES PATENTS

| | | |
|---|---|---|
| 1,159,504 | Krogh | Nov. 9, 1915 |
| 1,404,698 | Schleyer | Jan. 24, 1922 |
| 1,797,223 | Annis | Mar. 24, 1931 |